July 30, 1968   D. L. MILLER ET AL   3,394,621

INDEXING DETENT MECHANISM

Filed March 18, 1966

INVENTORS
DONALD L. MILLER
JAMES D. WHARMBY

BY Wolmar J. Stoffel
ATTORNEY

United States Patent Office 3,394,621
Patented July 30, 1968

3,394,621
INDEXING DETENT MECHANISM
Donald L. Miller and James D. Wharmby, Poughkeepsie, N.Y., assignors to International Business Machines Corporation, Armonk, N.Y., a corporation of New York
Filed Mar. 18, 1966, Ser. No. 535,385
7 Claims. (Cl. 74—813)

ABSTRACT OF THE DISCLOSURE

The indexing lock for a revolving carrier has detent engagement notches on the carrier provided with opposite locator detent contact surfaces and locking detent contact surfaces. A slidable locator detent has a positioning surface adapted to selectively contact the locator detent contact surface and a stop for limiting the extended position of the locator detent. A slidable locking detent has a wedging surface adapted to engage the locking detent contact surface. A detent actuating means is provided for initially urging the locator detent into engagement with the detent abutment means and subsequently moving the locking detent into camming engagement with the locking detent contact surface. In operation, the locking detent rotates the locator detent surface into contact with the extended locator detent, thus minimizing wear to the critical carrier locating mechanism of the lock.

---

This invention relates to lock mechanisms for movable carriers, more particularly to indexing detent mechanisms for revolving carriers which positively lock the carrier, and more specifically to an indexing lock for very precisely positioning and locking revolving carriers in indexed positions and greatly reducing wear on critical positioning surfaces.

The indexing detent mechanism is particularly useful to the electronic component manufacturing industry for use in screen printing apparatus for imprinting very small electrical circuits and the like on substrates. Such a printing apparatus is described in a commonly assigned U.S. patent application S.N. 535,384 entitled, "Printing Apparatus," filed Mar. 18, 1966.

Mechanisms for locating and locking rotary carriers in preselected angular positions, as for example, boring and turning machines, are old in the art. These locating and locking mechanisms are satisfactory for normal applications where great precision is not required. However, when a carrier must be repeatedly precisely located and securely locked to position precisions on the order of less than 0.0001 inch variation at the radius of the carrier, the known mechanisms do not perform satisfactory. Frequently, the locking detents of the known locking mechanisms are subject to significant sliding friction in the locking and unlocking operations, which over a period of time result in wear and consequent loss of accuracy. Further, the carrier shaft may be subject to forces imposed by the lock mechanism which cause stress and wear complications and loss of precision. Also, the known locating and locking mechanisms are inherently not capable of the extreme precision necessary in certain applications because the elements, as a practical matter, cannot be machined and maintained to the extreme precision necessary for satisfactory operation. These mechanisms do not have the type of mode of operation and association of elements to make possible the desired and/or required locating and locking precision.

An object of this invention is to provide a new indexing detent mechanism.

Another object of this invention is to provide a new indexing detent mechanism which operates with a minimum of sliding contact between the coacting surfaces of the carrier and the detent mechanism, thus eliminating wear on the coacting surfaces and maintaining extreme accuracy of operation.

Yet another object of this invention is to provide an indexing mechanism for a revolving carrier wherein there is provided a locator detent which moves into position with a minimum of sliding contact, and a locking detent which maintains the carrier precisely positioned relative to the locator detent.

Still another object of this invention is to provide an indexing detent mechanism having a mode of operation and association of elements to make possible great locating and locking precision.

Another object of this invention is to provide an indexing detent mechanism that is dependable in operation.

Another object of this invention is to provide an indexing detent mechanism for a movable carrier to automatically lock the carrier in accurately indexed relation.

Still another object of this invention is to provide a new indexing detent mechanism having an association of elements thereof which will not experience appreciable wear over prolonged periods of operation.

In accordance with the aforementioned objects the index lock of the invention has a detent engagement means on a carrier having a locator detent contact surface and a locking detent contact surface. A longitudinally slidable locator detent having a positioning surface adapted to selectively contact the locator detent contact surface is provided. A detent abutment means limits the longiudinal movement of the locator detent. A longitudinally slidable locking detent having a wedging surface adapted to selectively contact the locking detent contact surface is also provided. A detent actuating means is provided for urging the locator detent into engagement with the detent abutment surface means in advance of moving the locking detent into wedging engagement with the locking detent contact surface.

In the indexing lock of our invention, sliding friction of the locator detent is minimized, thereby minimizing wear and attendant loss of precision. The locator detent is moved into carrier locating position, with the seated position accurately and consistently determined by an abutment means. Thus, the heated position of the locator detent is always constant. This mode of operation and association of parts provides a positive, very precise carrier locator operation that is largely immune to wear. The locking detent is subsequently moved into locking wedging position to positively hold the carrier into engagement with the very precisely mounted locator detent. Although sliding friction occurs at this operation, the resultant wear is not significant since it will not affect the carrier position. The function of the locking detent is to move and hold the carrier into engagement with the locator detent. Any wear which may occur will automatically be compensated by a slightly different seated position of the locking detent. Normally the locking detent is resiliently biased into seated relation. As will be appreciated, the indexing lock of our invention precisely positions a carrier, maintains this preciseness of operation over long periods of time because wear is minimized. No axially directed forces are imposed on the shaft of a rotatable carrier which might otherwise produce wear and other complications. Still further, a safety device can be embodied quickly and easily in the indexing lock of our invention which immediately halts indexing operation of the carrier in the event that the locking function of the indexing detent mechanism is interrupted. The operation of the indexing lock of our invention is simple and effective and can be serviced and maintained at a minimum of expense.

The foregoing and other objects, features and advantages of the invention will be apparent from the following more particular description of a preferred embodiment of the invention, as illustrated in the accompanying drawings.

Figure 1:
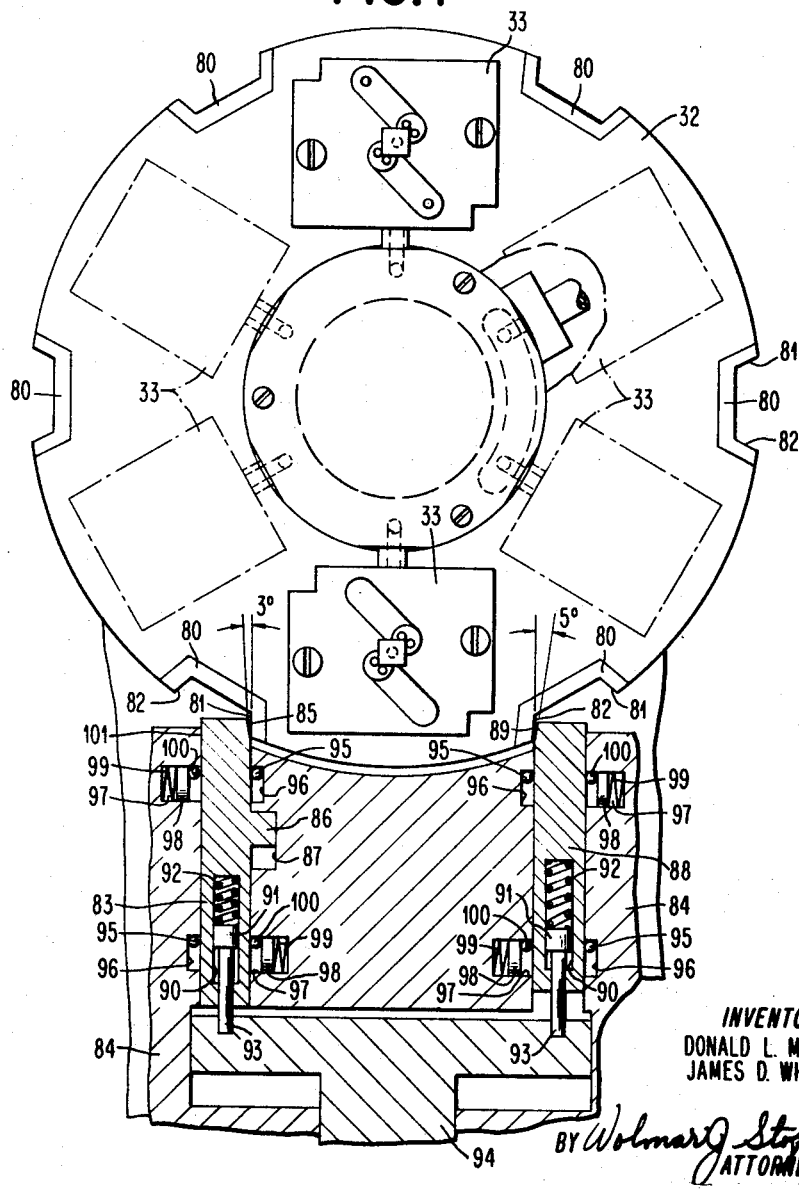
FIG. 1 is a top plan view, partially in section, and with portions broken away for ease of illustration showing a preferred specific embodiment of the indexing detent mechanism in combination with a rotatable carrier.

Referring now to the figures of the drawings, there is shown in FIG. 1 the indexing lock of the invention mounted for locating and locking revolving carrier 32. Any suitable workpiece holder, tool, or the like, can be mounted on carrier 32. Further, carrier 32 can be designed to index any desired number of times for one complete revolution of same.

A typical application in which the indexing lock of our invention is useful is for precisely locking a screen printing apparatus disclosed and claimed in detail in the aforementioned patent application entitled, "Printing Apparatus." Briefly, there is depicted six workpiece holders 33 located on the top surface of carrier 32 which are indexed through a loading station (not shown), a printing station (not shown), and an unloading station (also not shown).

Carrier 32 is provided with detent engagement means on the peripheral edge in the form of hardened steel inserts 80 having a locator detent contact surface 81 and a locking detent surface 82. Preferably the detent engagement means are two spaced notches in the carrier. A separate pair of notches provided with the aforementioned contact surfaces can be provided, or alternately, notches can be positioned between the various locations to be locked, as illustrated in FIG. 1, wherein the front and trailing edge surfaces are used for sequential locking operations. A longitudinally slidable locator detent 83 is slidably supported in base 84. Locator detent 83 has a positioning surface 85 adapted to selectively engage contact surface 81 in the insert 80. As indicated in FIG. 1, the angle of detent surface 85 with respect to the longitudinal axis of locator index 83 is three degrees. The contact surface 81 is complementary to surface 85 on detent 83 when the carrier is in locked position. The reason for the angle of the surfaces will become more apparent in the description that follows. An abutment is provided on detent 83 in the form of a lug 86 slidable in slot 87. Lug 86 limits the longitudinal movement of detent 83 and determines the exact seated position of the detent. A longitudinally slidable locking detent 88 having a wedging surface 89 is slidably mounted in base 84. As indicated in FIG. 1 the angle of the wedging surface 89 relative to the longitudinal axis of detent 88 is five degrees. Contact surface 82 on insert 80 is complementary to surface 89 when the carrier 32 is in indexed or locked position.

A detent actuating mechanism moves the locator detent 83 into engagement with the detent abutment means in advance of moving the locking detent 88 into wedging engagement with the locking detent contact surface 82. The detent actuating mechanism consists of longitudinally extending recesses 90 in each of detents 83 and 88. A slide element 91 is slidably disposed in the recess 90. A spring 92 is also positioned in each recess 90 having one end in engagement with the end of the recess and the other in biasing engagement against the slide 91. Springs 92 are loaded so as to force the slides 91 against the opposite ends of recesses 90 when the respective detents are in unactuated or non-locking position, illustrated in FIG. 2. Slide element 91 includes a rod 93 rigidly joined to a crossbar 94. A suitable linkage (not shown) applies a force against crossbar 94 which in turn forces the detents 83 and 88 into locking position. Crossbar 94 is actuated by a suitable cam or other actuating means correlated with the indexing drive for carrier 32. Any suitable cam or other actuating means can be utilized and will not be described in detail. Any suitable biasing arrangement can be used to move the detents into engagement that achieves the desired mode of operation. For example, the detents can be resiliently biased into engagement by a pair of arms mounted on a pivotable shaft.

Figure 2:
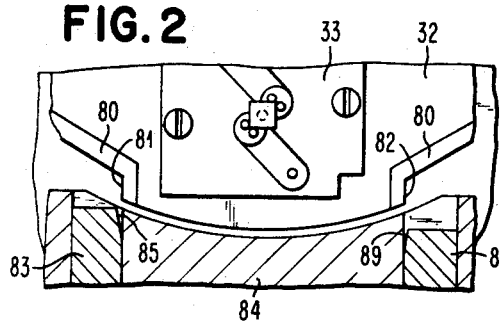
FIG. 2 is a detail view in broken section illustrating the relative position of the locating and locking detents in the disengaged or unlocked relationship with the carrier.
Figure 3:
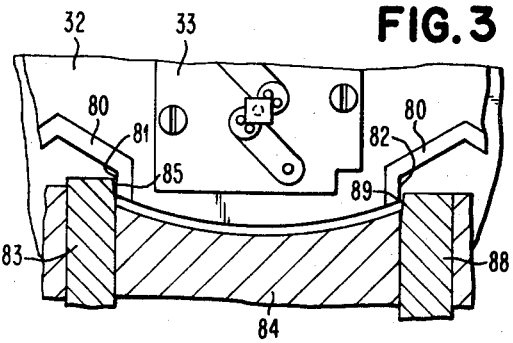
FIG. 3 is a detail view in broken section illustrating the relative positions of the locating and locking detents at an intermediate stage of the locating and locking operation.

In FIG. 2 the detents 83 and 88 are shown in unengaged or non-locking position. FIG. 3 illustrates the relative position of the detents and inserts 80 on carrier 32 at an intermediate stage of the locking operation, that is with locating detent 83 in seated position and locking detent about to advance into wedging engagement. FIG. 1 illustrates the detents in the fully locked position. In the unlocked position, illustrated in FIG. 2, crossbar 94 is in the retracted position and the slides 91 are biased by springs 92 to the rear end of recesses 90. In this relative relationship the leading carrier engaging end of detent 83 is advanced relative to the engaging end of detent 88. Preferably, in operation locator detent 83 is moved into seated position with lug 86 in abutting relation slightly before the carrier is rotated to the indexed position. Normally, the driving mechanism of the carrier moves the carrier just short of the indexed position, and the detent 88 completes the rotation. Therefore, the timing of the movement of crossbar 94 to urge detent 83 outwardly is such that sliding friction between surfaces 81 on the insert and 85 on the detent is avoided because detent 83 is extended just before the carrier is rotated to put the surfaces into abutting engagement. The relative positions of detents 83 and 88 and the carrier 32 at this point are illustrated in FIG. 3 of the drawings. Note that detent 88 lags behind detent 83. As the advancing of crossbar 94 continues, spring 92 in detent 83 is compressed while spring 92 in detent 88 is not because detent 88 has not encountered any significant opposition. As the advancing movement of crossbar 94 continues, wedging surface 89 will come into wedging contact with contact surface 82 on insert 80 thus urging surface 81 of insert 80 against surface 85 of detent 83. Ultimately both detents are firmly placed in engagement with the respective surfaces of inserts 80 thereby accurately positioning the carrier 32 in the index position. The angle of locating surface 85 on locator detent 83 is less than the angle of wedging surface 89 on locking detent 88 to prevent detent 83 from being forced backward out of seated relationship by wedging the action of detent 88.

In order to further improve the efficiency and effectiveness of the indexing lock of the invention, the detents 83 and 88 can be supported on bearing means. An embodiment of the bearing means is illustrated in FIG. 1. Detents 83 and 88 are provided with grooves in the edges thereof which serve as braces for ball bearings. Ball bearings 95 are seated in slots 96 in base 84. A spring-loaded bearing assembly is provided on the carrier engaging end of each of the detents opposite the insert engaging surfaces. The spring-loaded bearing consists of a recess 97 having a plug 98 slidably disposed therein, a spring means 99 urging the plug 98 toward the detent, and ball bearing 100. As indicated in FIG. 1, the spring-loaded bearings should be positioned adjacent the locking ends of the detents opposite the insert or notch engaging surfaces thereof. Similar spring-loaded bearing assemblies can be provided on the opposite ends of the detents on the opposite side edges.

In operation, as detent 83 is urged into position into locating engagement with insert 80, the bearings, previously described, support the detent for sliding engagement out of contact with the surfaces of base 84. However, upon completion of the wedging engagement of the locking detent 88, wherein the surface 85 of the detent is forced against the surface 81 of the insert the spring-loaded bearing 100 is forced inwardly placing the surface 101 of detent 83 in firm abutting engagement with the corresponding slide surface of base 84. This surface contact is achieved after the detent 83 is moved longitudinally into its seated position in insert 80. Therefore, there is virtually no sliding friction which can cause wear and the like.

While the invention has been particularly shown and described with reference to a preferred specific embodiment thereof, it will be understood by those skilled in the art that various changes in form and detail may be made therein without departing from the spirit and scope of the invention.

We claim:
1. An indexing lock for a revolving carrier comprising,
   detent engagement means on said carrier having a locator detent contact surface and a locking detent contact surface,
   a longitudinally slidable locator detent movable toward and away from said carrier and having a positioning surface adapted to selectively contact said locator detent contact surface,
   a detent abutment means for limiting longitudinal movement of said locator detent,
   a longitudinally slidable locking detent movable toward and away from said carrier and having a wedging surface adapted to selectively contact said locking detent contact surface,
   support means for slidably supporting said locator detent and said locking detent,
   a detent actuating means for urging said locator detent into engagement with said detent abutment means in advance of moving said locking detent into wedging engagement with said locking detent contact surface adapted in use to rotate said carrier and said locator detent surface of said detent engagement means into firm engagement with said positioning surface of the extended locator detent.

2. The indexing lock of claim 1 wherein said wedging surface is inclined at a greater angle relative to the longitudinal axis of said locking detent than said positioning surface relative to the longitudinal axis of said locator detent.

3. The indexing lock of claim 1 wherein said detent abutment means is comprised of
   an axially extending protubearance on said locator detent,
   and a retainer guide in said support means slidably receiving said protuberance.

4. The indexing lock of claim 1 wherein said detent engagement means is comprised of
   a pair of spaced detent receiving notches in said carrier,
   said locator detent contact surface defining a portion of one of said notches,
   and said locking detent contact surface defining a portion of the other of said notches.

5. The indexing lock of claim 4 wherein said support means for slidably supporting said locator detent and said locking detent comprises,
   a base,
   a first spring biased ball bearing assembly supporting the end of said locator detent positioned opposite said positioning surface,
   a second spring biased ball bearing assembly supporting the end of said locking detent positioned opposite said wedging surface,
   each of said ball bearing assemblies having a slide element disposed in an aperture in said base,
   a ball bearing in rolling contact with said slide element and the edge surface of said respective detent,
   and a spring seated in said aperture biasing said plug outwardly toward the respective detent.

6. The indexing lock of claim 1 wherein said detent actuating means is comprised of
   longitudinally extending recesses in said locator detent and said locking detent,
   an actuator element having slidable abutment means disposed in each of said recesses,
   springs in each of said recesses,
   each spring having one portion in fixed relation to said recess and another portion in abutting relation to said slidable abutment means,
   said recesses, slidable abutment means, and springs arranged to position said locator detent in advance of said locking detent in the direction of said carrier.

7. The indexing lock of claim 6 wherein said springs maintain said slidable abutment means in contact with the rear ends of said recesses when said detents are in retracted unlocking engagement and
   the length of locator detent measurd from the leading end to the rear end of said recess is greater than the length of the locking detent measured from the leading end to the rear end of said recess.

References Cited
UNITED STATES PATENTS

| | | | |
|---|---|---|---|
| 398,650 | 2/1889 | Peters | 74—822 X |
| 728,573 | 5/1903 | Hanson | 74—822 |
| 2,590,119 | 3/1952 | Osterhus | 74—813 X |
| 2,633,777 | 4/1953 | Hoern | 188—69 |
| 2,685,928 | 8/1954 | Bergh | 308—6 X |
| 2,704,671 | 3/1955 | Abramoska et al. | 74—813 X |
| 2,851,779 | 9/1958 | Cox | 74—813 X |
| 2,973,672 | 3/1961 | Thornbery | 74—813 |
| 2,998,754 | 9/1961 | Bialy | 308—6 |
| 3,101,013 | 8/1963 | Ayers et al. | 74—813 |
| 3,120,134 | 2/1964 | Sweeney | 74—813 X |

FRED C. MATTERN, JR., *Primary Examiner.*
F. D. SHOEMAKER, *Assistant Examiner.*